US008504991B2

(12) United States Patent
Huang et al.

(10) Patent No.: US 8,504,991 B2
(45) Date of Patent: *Aug. 6, 2013

(54) CROSS-BROWSER TESTING OF A WEB APPLICATION

(75) Inventors: Dong Huang, Shanghai (CN); Yang Li, Shanghai (CN); Shao Feng Shi, Shanghai (CN); Kai Ye, Shanghai (CN); Deng Peng Zhou, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 335 days.

This patent is subject to a terminal disclaimer.

(21) Appl. No.: 12/890,849

(22) Filed: Sep. 27, 2010

(65) Prior Publication Data

US 2011/0078663 A1 Mar. 31, 2011

(30) Foreign Application Priority Data

Sep. 29, 2009 (CN) .......................... 2009 1 0175691

(51) Int. Cl.
*G06F 9/44* (2006.01)
(52) U.S. Cl.
USPC ......................................................... 717/126
(58) Field of Classification Search
USPC ................................................. 717/125, 126
See application file for complete search history.

(56) References Cited

U.S. PATENT DOCUMENTS

| | | | |
|---|---|---|---|
| 6,845,505 B1 | 1/2005 | Adunuthula et al. | |
| 6,865,599 B2 * | 3/2005 | Zhang ........................... | 709/218 |
| 2001/0013043 A1 * | 8/2001 | Wagner .......................... | 707/511 |
| 2005/0177597 A1 | 8/2005 | Elmer | |
| 2011/0289489 A1 * | 11/2011 | Kumar et al. ................. | 717/135 |

FOREIGN PATENT DOCUMENTS

CN 1521996 8/2004

OTHER PUBLICATIONS

Ardakani et al., "A multi-agent system apporach for user-session-based testing of web applications", Proceedings of the 7th WSEAS international conference on Distance learning and web engineering, Beijing, China , 2007, pp. 326-331.
Domingue et al., "IRS-III: A broker-based approach to semantic Web services", Journal of Web Semantics, vol. 6, issue 2, Apr. 2008, pp. 109-132.
Rasanen, "Service Brokers for the Internet", May 8, 1998, pp. 1-10 www.tml.tkk.fi/.../inetw98-paepr.html.
Huang et al., "Method and Apparatus for Cross-Browser Testing of a Web Application," U.S. Appl. No. 13/445,200, filed Apr. 12, 2012, 23 Pages.

(Continued)

*Primary Examiner* — Philip Wang
(74) *Attorney, Agent, or Firm* — Yee & Associates, P.C.; David A. Mims

(57) ABSTRACT

An apparatus for cross-browser testing of a web application is disclosed, including: a first broker residing among a plurality of browsers for receiving information of a user action from a browser operated by a user among the plurality of browsers and for transmitting the information of the user action to other browsers so that the other browsers can execute the user action; a second broker residing between the plurality of browsers and the web application for receiving at least one web request generated by executing the user action from the plurality of browsers and for determining whether to be able to merge the at least one web request, so as to determine whether the plurality of browsers are compatible with the web application. An associated method is also provided.

10 Claims, 2 Drawing Sheets

OTHER PUBLICATIONS

Preliminary amendment dated Apr. 12, 2012, regarding U.S. Appl. No. 13/445,200, 5 Pages.

Office Action, dated Nov. 14, 2012, regarding U.S. Appl. No. 13/445,200, 11 pages.

USPTO Notice of Allowance for U.S. Appl. No. 13/445,200, Mar. 14, 2013, 7 pages.

* cited by examiner

CROSS-BROWSER TESTING OF A WEB APPLICATION

BACKGROUND

1. Field

The present invention relates to the computer field, particularly to web application testing; and more particularly, to a method and apparatus for cross-browser testing of a web application.

2. Description of the Related Art

The last several years have seen explosive growth in the number of web applications which facilitate business activities or provide service, either internally or externally. Meanwhile, a great diversity of web browsers have been created and made available with variant capabilities on different platforms. To realize the most of business values, it is usually a priority to ensure web browser compatibility for a web application. However, there are considerable features that are not specified in detail in standards, which results in some implementation-specific interpretations. What's more, some vendors intend to add browser-specific extensions. Even different versions of the same product may behave inconsistently in some cases.

Different interpretations and behaviors across different browsers and versions bring heavy burden to the development of browser compatible web applications. Functional verification tests are often needed to be executed on several popular web browsers, such as Internet Explorer, Firefox and Safari, to make sure that the pages have similar appearances and functions in different browser environments. A lot of duplicate testing efforts are involved, being unable to test on different browsers simultaneously. Though some test automation tools may help to some extent, testers are still required to operate the test tools in different browser environments. What's more, it is not easy for testers to capture the differences between the test execution results on different browsers, and this requires the testers to have very high skills and to pay a lot of time and effort. In addition, since the testing for one browser may change the server environment, that is, executing an irrevocable action, e.g., deleting some record in a database, the server environment needs to be set repeatedly, which brings further burden to the testing work.

SUMMARY

In order to solve at least one of the above problems in the prior art, the technical solution of the present invention is proposed.

In one aspect of the present invention, there is provided an apparatus for cross-browser testing of a web application, comprising: a first broker residing among a plurality of browsers for receiving information of a user action from a browser operated by a user among the plurality of browsers and for transmitting the information of the user action to other browsers so that the other browsers can execute the user action; a second broker residing between the plurality of browsers and a web application for receiving at least one web request generated by executing the user action from the plurality of browsers and for determining whether to be able to merge the at least one web request, so as to determine whether the plurality of browsers are compatible with the web application.

In another aspect of the present invention, there is provided a method for cross-browser testing of a web application, comprising: receiving, by a first broker residing among a plurality of browsers, information of a user action from a browser operated by a user among the plurality of browsers, and transmitting the information of the user action to other browsers so that the other browsers can execute the user action; receiving, by a second broker residing between the plurality of browsers and a web application, at least one web request generated by executing the user action from the plurality of browsers and determining whether to be able to merge the at least one web request, so as to determine whether the plurality of browsers are compatible with the web application.

The advantages of the present invention are eliminating repeated testing on a plurality of browsers, which saves time and cost, increases productivity and improves users' experiences. Furthermore, by rendering the testing results on different browsers, comparison and analysis can be better performed.

BRIEF DESCRIPTION OF THE SEVERAL VIEWS OF THE DRAWINGS

The appended claims set forth the creative features considered as characteristic of the present invention. However, the invention itself and its preferred modes, objects, features and advantages will be better understood by referring to the detailed description of the exemplary embodiments when read in conjunction with the attached drawings, in which:

DETAILED DESCRIPTION

The embodiments of the present invention will now be described with reference to the accompanying drawings. In the following description, numerous details are described to enable the present invention to be fully understood. However, it is apparent to those skilled in the art that the implementation of the present invention can be without some of these details. In addition, it should be appreciated that the present invention is not limited to the described specific embodiments. In contrast, it is contemplated to implement the present invention using any combination of the following features and elements, whether they involve different embodiments or not. Therefore, the following aspects, features, embodiments and advantages are only illustrative, rather than elements or limitations of the appended claims, unless explicitly stated otherwise in the claims.

The present invention proposes a method and apparatus for cross-browser testing of a web application. A client browser broker, residing among a group of target browsers, captures interactive actions from the browser operated by the user, and performs the same actions against other browsers of the set of target browsers. An intermediate browser broker, residing between the target browsers and the web application, transmits a single request generated from the requests from the group of browsers to the web application, and distributes the response from the web application to each one of the group of browsers so as to be rendered on each of the browsers simultaneously.

Figure 1:
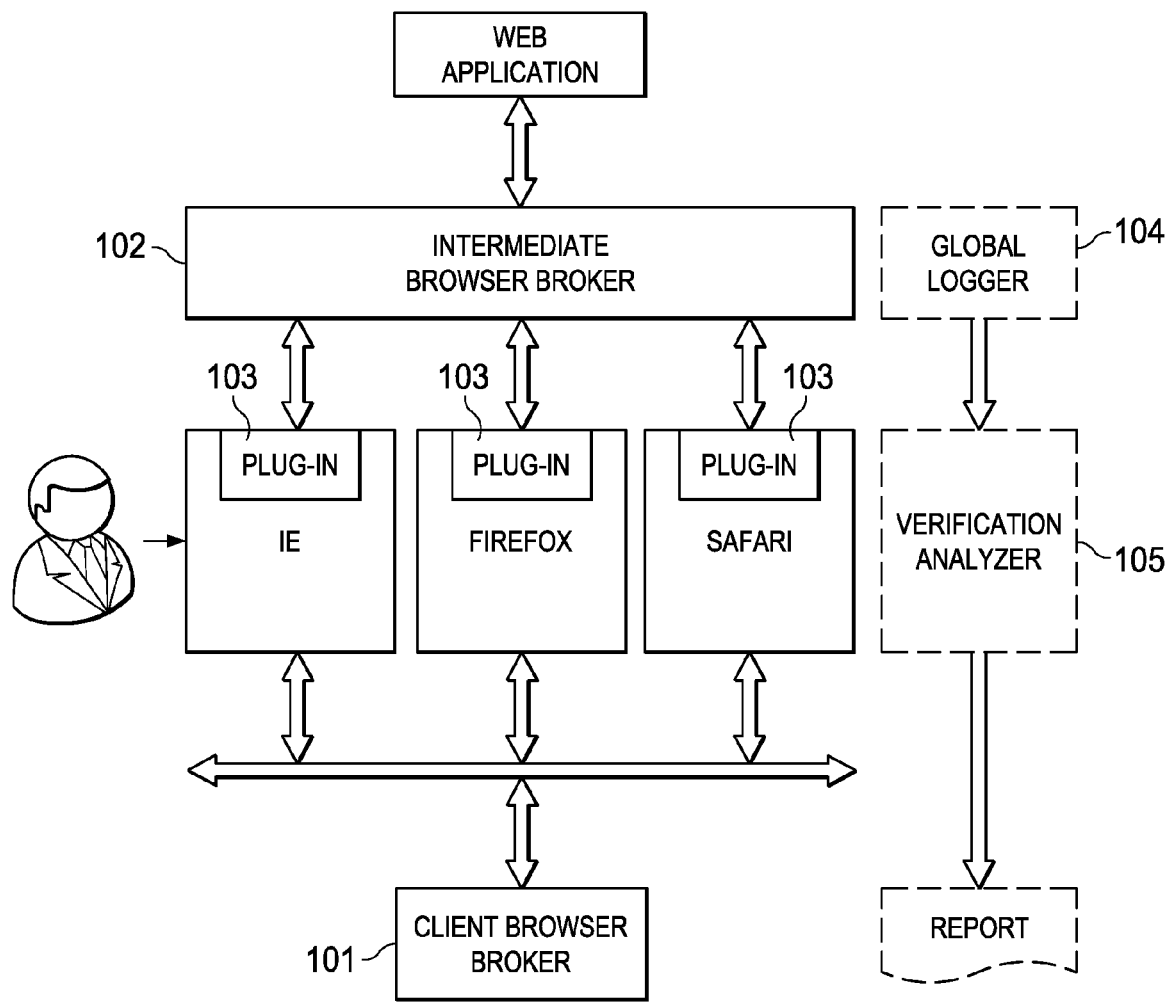
FIG. 1 depicts the architecture of an apparatus for cross-browser testing of a web application according to an embodiment of the present invention.

Now referring to FIG. 1, it depicts the architecture of an apparatus for cross-browser testing of a web application according to an embodiment of the present invention. As shown, the apparatus according to an embodiment of the present invention comprises a client browser broker 101 residing among a plurality of browsers, an intermediate browser broker 102 residing between the plurality of browsers and the web application and a plug-in 103 residing at each of the browsers.

The plug-in 103 residing at the browser operated by the user is for capturing a user action in the browser and transmitting the corresponding information of the action to the client browser broker 101. For example, if the user left-clicks a page element in the page displayed in the browser, the plug-in may send the information, such as the action type of left-click, the name or identifier of the page element where the mouse pointer is positioned, the offset of the mouse pointer in the page element, etc., to the client browser broker 101.

The client browser broker 101 is for receiving the user action information from the browser operated by the user and transmitting the user action information to each of the other browsers.

The plug-in 103 residing at each of the other browsers is for receiving the user action information from the client browser broker 101, and executing the corresponding user action at the browser. For example, if the received user action information includes the action type of left-click, the name or identifier of the page element, and the offset of the mouse pointer in the page element, then the plug-in 103 at each of the other browsers can execute the left-click action at the same offset in the same page element of the same web page displayed in the browser.

In some other embodiments of the present invention, the apparatus may not comprise the plug-in 103 residing at each of the browsers; rather, the corresponding functions may be performed by each browser per se or other modules. That is, the browser per se operated by the user or an another module captures the user action in the browser and transmits the information of the user action to the client browser broker, and each of the other browsers per se or other modules receive the user action information from the client browser and executes the corresponding user action at the browser.

In each of the browsers, the proxy of the browser may be set in advance as the intermediate browser broker 102 by the proxy mechanism of the browser. Thus, the web requests generated by performing user actions in each of the browsers are transmitted to the intermediate browser broker 102 through the proxy mechanism of the browser.

The intermediate browser broker 102 is for, after receiving at least one web request from the plurality of browsers, generating one web request from the at least one web request and transmitting the one web request to the web application. Furthermore, after receiving a response to the web request from the web application, the intermediate browser broker 102 copies and transmits the response to each of the browsers, and thus each of the browsers may render the response respectively after receiving it.

The intermediate browser broker 102 may use different policies to merge the at least one web request received from the plurality of browsers into one web request. If the merge succeeds, the merged web request may be transmitted to the web application. If the merge fails, it may be determined that the plurality of browsers are not compatible with each other, which may be reported to the user. Just for example, the merge may be performed by using the following simple algorithm:

According to the HTTP specification (http://www.w3.org/Protocols/HTTP/Request.html), a request can be divided into three parts:
The first line, including: Method, URI and Protocol Version;
A set of headers, each is a key=value pair;
Data The algorithm first checks whether the first lines of the plurality of requests are exactly the same. If not, it is determined that the merge fails and the browsers are not compatible.

Secondly, the algorithm checks whether a selected subset of the headers are the same. If not, it is determined that the merge fails and the browsers are not compatible.
Headers which usually should be checked are: Content-Type, Cookie;
Headers which usually should not be checked are: User-Agent;
The selected subset that should be checked may be configurable to better suit different kinds of applications, Then, the algorithm checks whether the requested data are exactly the same. If not, it is determined that the merge fails and the browsers are not compatible.

If all the above three parts have been checked successfully, then a merged request is generated, which includes:
The first line of any request (since they are all the same);
The headers of the request sent by the "main" browser, which may be the most popular browser, e.g., Internet Explorer, or any other type of browsers. Of course, the headers of the request transmitted by any one of the plurality of browsers are also feasible.
The data of any request (since they are all the same).

When static resources are cached in a browser, execution of a user action on the browser may not inevitably result in the generation of a web request. In such a case, the intermediate browser broker 102 may generate a merged request merely from the received at least one web request, rather than from each web request from each of the browsers. In such a case, the plug-in 103 of each browser may further determine whether the execution of a user action on the browser will generate a web request and notify the intermediate browser broker 102 when no web request is generated. In this way, the intermediate browser broker 102 may not wait for the web request from the browser, and a single merged request may be generated by the web requests from the other browsers.

Also in FIG. 1, according to an embodiment of the present invention, the apparatus for cross-browser testing of a web application may further comprise an optional global logger 104. The global logger 104 is for maintaining logs of testing interactions between the user and the web application, i.e., tracking and logging information like the requests and responses transmitting between the browsers and the server, as well as the resulted browser states, etc. More specifically, the logger may log one or more items of the following information:

The HTTP request sent out from each browser and a merged request generated at the intermediate browser broker 102 in the case that the merge succeeds, or a merge error generated at the intermediate browser broker 102 in the case that merge fails.

The HTTP response returned by the web application to the intermediate browser broker 102.

The DOM structure and rendering errors generated by each browser rendering the returned response. After the HTTP response from the web application is copied at the intermediate browser broker 102 and returned to each of the browsers, the browsers may render the response, executing embedded scripts if any, and thus finally the user will see the rendered HTML document. The global logger 104 may capture and log the DOM structure of the HTML document and any error occurred during the rendering through a browser plug-in (which may be the above plug-in for capturing, transmitting, receiving and executing the user action, or another plug-in).

The screenshot generated by each browser rendering the returned response. After each of the browsers renders the response, the global logger 104 may capture and log the screenshot of the browser through the plug-in.

According to an embodiment of the present invention, the apparatus for cross-browser testing of a web application further comprises an optional verification analyzer 105. The verification analyzer 105 is for automatically verifying and analyzing the logs of testing interactions recorded by the global logger so as to determine the compatibility of the plurality of browsers, to obtain the testing results of testing the web application by using the plurality of browsers, and to generate a corresponding report. More specifically, the verification analyzer may analyze and verify in the following manner:

Verify HTTP requests. First, the merge of requests is checked. If there is a successful merge, then the requests (and the browsers that issue them) are considered compatible. Otherwise, the requests and the browsers are considered incompatible, and an incompatibility error is reported to the user.

In addition, textual requests (including the merged request) are compared, and the results are visualized to the user. Since HTTP requests are plain texts, diff or any other text comparison tools may be used to perform the comparison, and any text comparison visualization tools, like the dual-panel comparison used by Eclipse, may be used to perform the visualization.

Verify the HTTP response returned by the web application. Since all the browsers receive the same copy of the response, cross-browser verification is not needed. However, pattern matching may be performed on the response text to verify the correctness of the web application. For example, regular expressions can be used to check if "Form submitted successfully" is included in the response.

Verify the DOM structures and rendering errors after the response gets rendered. If there is an error during rendering, the response, the error and the problematic browser may be reported to the user. Further, the DOM structures of different browsers may be compared, and their differences may be displayed to the user.

Verify the screenshots of the browsers after the response is rendered. The captured screenshots of different browsers may be compared with each other, and an average similarity score (e.g., ranging from 0% to 100%) may be calculated to measure the user interface (UI) consistency between the browsers. A pre-set threshold (e.g., 95%) can be used to judge whether the UIs of the different browsers can be considered to be consistent. If not, a UI inconsistency error may be reported to the user. Many existing image similarity calculation and visualization tools can be used to compare the screenshots of different browsers and to calculate their similarity score values.

The verification analyzer 105 can generate a corresponding report according to the above verifying and analyzing process. The report may include the following contents:

Whether the HTTP requests of different browsers are compatible, and a comparison of the request texts;

Whether the HTTP response matches pre-defined patterns (to check the functional correctness);

Whether the browsers encounter errors during rendering, as well as a comparison of the DOM structures on different browsers;

Whether the resulted UIs are consistent, and a comparison of the screenshots;

All logged detailed information.

The user can get the testing results of the different browsers and the compatibility between the different browsers by reviewing the report.

In some embodiments of the present invention, the apparatus for cross-browser testing of a web application may not comprise the verification analyzer 105. Rather, the user may verify and analyze the testing results by reading and analyzing the log information recorded by the global logger 104. In some other embodiments of the present invention, the apparatus for cross-browser testing of a web application may not comprise the verification analyzer 105 and the global logger 104; rather, the user may obtain the testing results and determine browsers compatibility by viewing the results rendered on the screens of different browsers.

The apparatus for cross-browser testing of a web application according to the embodiments of the present application as described above and illustrated in FIG. 1 are only exemplary of, and not limited to, the present invention. For example, the type and number of the depicted browsers are only exemplary, and the apparatus of the present invention can use any type and number of browsers. In some embodiments of the present invention, only one browser in the apparatus can be used as the browser operated by the user; and in some other embodiments of the present invention, any one of the browsers in the apparatus may be used as the browser operated by the user. The apparatus according to embodiments of the present invention may have more, less or different modules, and the relationships between the modules can be different from what is illustrated and described. In addition, the nomenclature of the modules herein is only for convenience of illustration, rather than limitation to the present invention. For example, the client browser broker may also be referred to as a first broker or a first module, etc., and the intermediate browser broker may also be referred to as a second broker or a second module, etc.

Figure 2:
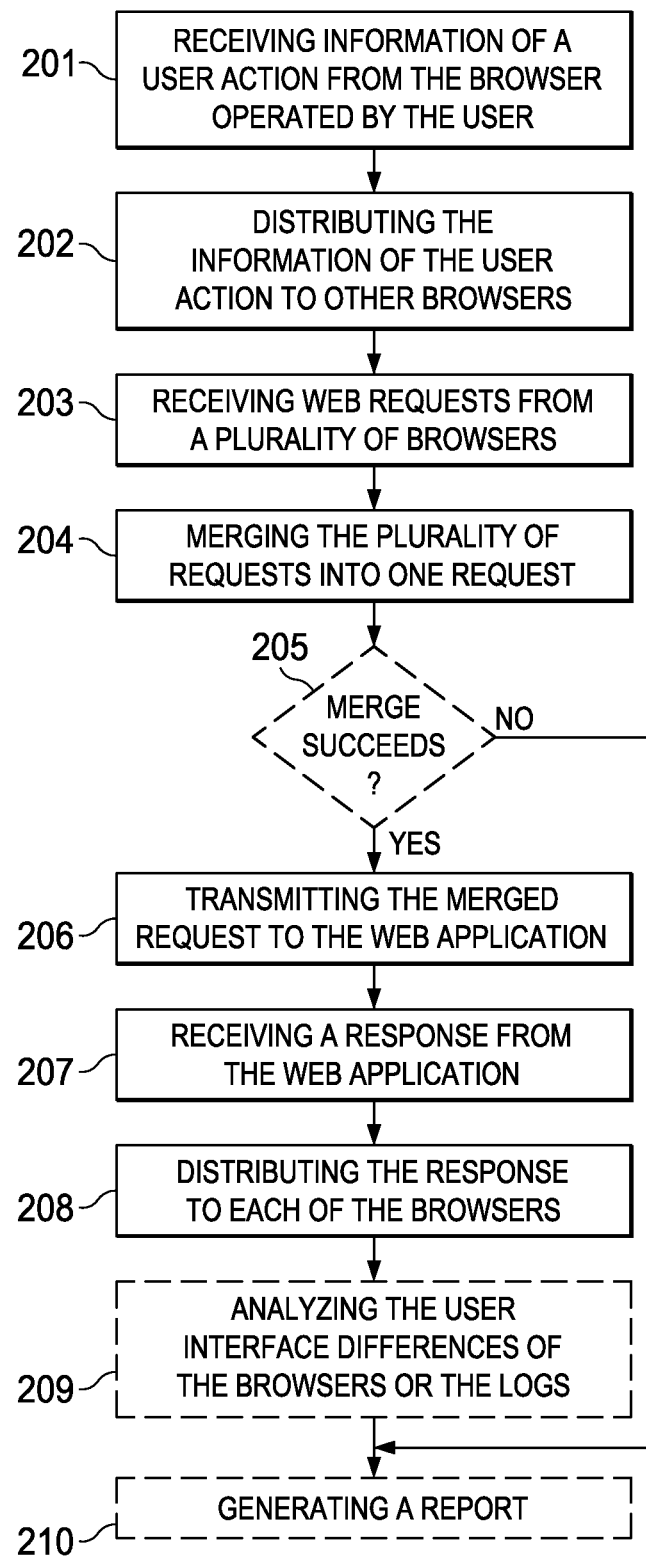
FIG. 2 illustrates the flowchart of a method for cross-browser testing of a web application according to an embodiment of the present invention.

Now referring to FIG. 2, the flow of a method for cross-browser testing of a web application is shown according to the embodiments of the present invention. The method can be executed by the above apparatus for cross-browser testing of a web application according to an embodiment of the present invention. For simplicity, some redundant details described hereinabove are omitted from the description below. Therefore, the method can be better understood by referring to the above description.

As shown, at step 201, a client browser broker, residing among a plurality of browsers, receives the information of a user action from the browser operated by the user among a plurality of browsers. The user may execute the user action in the operated browser to send a request to a web application. For example, the user may send the request to the web application by clicking a button in a page displayed in the browser or by inputting the address of the web application in the address bar of the browser.

At step 202, the client browser broker distributes the information of the user action to one or more other browsers, so as to send requests to the web application by executing the user action in the other browsers.

At step 203, an intermediate browser broker, residing among the plurality of browsers and the web application, receives at least one web request generated by the user action from the plurality of browsers.

At step 204, a merged request is generated from the at least one web request.

At an optional step 205, it is determined whether the merge succeeds.

If the determination is NO, step 210 is executed.

If the determination is YES, step 206 is executed and the merged request is sent to the web application.

At step 207, the intermediate client broker receives a response from the web application.

At step 208, the response is distributed to each of the plurality of the browsers so that the plurality of the browsers render the response, respectively.

During the process of executing the above steps, logs of the testing interactions may be generated, comprising, e.g., contents of the web request sent by each browser, contents of the response from the web application, the DOM structure and rendering error of the page rendered at each browser, and/or the screenshot of the page rendered at each browser.

At an optional step 209, UI differences between different browsers or logs of the testing interactions are analyzed. Such an analysis can be automatically performed by the apparatus of the present invention or be manually performed by the user, or by both, either simultaneously or successively.

At an optional step 210, a testing report is generated according to the above analysis or the determination result of NO at step 205.

In the following, an exemplary scenario will be used to describe the flow of the method for cross-browser testing of a web application according to an embodiment of the present invention. A software engineer is going to test a login module of a newly developed web application. Since the target users of the web application may come from different countries with different platforms and browsers, this testing needs to verify functions and compatibility on several popular browsers, such as Microsoft Internet Explorer, Mozilla FireFox and Apple Safari. The engineer starts up the browsers and the apparatus for cross-browser testing of a web application according to an embodiment of the present invention, sets the proxies of the respective browsers as the intermediate browser broker in the apparatus for cross-browser testing of a web application according to an embodiment of the present invention by the proxy mechanism of the browsers, and then starts the testing.

First, the engineer inputs the web address (URL) of the web application in the address bar of the operated browser. The input is copied to other browsers by the client browser broker at once. When the "Enter" button is pressed, the client browser broker sends the command to other browsers, and the operated browser and other browsers all receive the command and trigger a HTTP request at the same time. These requests are captured by the intermediate browser broker since it has been set as the proxy of these web browsers. The intermediate browser broker analyzes the captured requests and then tries to merge these requests into one request according to a predefined policy. If the merge fails, then the apparatus according to an embodiment of the present invention reports an error directly.

If the merge succeeds, the intermediate browser broker transmits the generated single merged request to the server of the target web application. When receiving a response from the web application, the intermediate browser broker makes a copy of the response for each of the browsers, and forwards the copies of the response to the respective browsers. Each browser processes the response and displays a corresponding web page, such as a login form page. After the screen of each browser is displayed, the apparatus according to an embodiment of the present invention analyzes the differences among the UIs of different browsers and generates a report. In addition, the apparatus may, during the whole process that the browsers transmit the requests and receive the response from the web application, generate corresponding logs, and may generate a corresponding report by analyzing the logs.

Subsequently, the software engineer inputs a user name and password in the login form page in the operated browser and then clicks the "Login" button. At this time, the user action and the generated web requests will be processed in the same way as in the previous step. Finally, the login result page will be displayed in each of the browsers.

The apparatus according to an embodiment of the present invention may automatically verify and analyze the differences among the UI displays in different browsers and give a rating. If the rating is lower than an acceptable criterion, the apparatus may inform the user to do a manual verification. If the user needs more detailed information, then he/she can read the report about the contents of each request and response and screenshots generated during the above testing interactions by the apparatus according to an embodiment of the present invention.

The flow of the method for cross-browser testing of a web application according to an embodiment of the present invention as described and illustrated above are merely exemplary rather than limited to the method of the present invention. The method can either be executed by the modules in the apparatus for cross-browser testing of a web application according to an embodiment of the present invention as described above, or be executed by other modules. In different embodiments of the present invention, the method may have more, less or different steps, and the order of the steps may be different from what is described and illustrated. In addition, the plural steps may be combined into one step, and vice versa. All these variations are within the spirit and scope of the present invention.

Compared with the prior art, the present invention has the following features: the user action is automatically applied to a plurality of target browsers, without needing the user to execute the same user action on the plurality of target browsers respectively; a plurality of browser requests are merged and transmitted to the web application only once, rather than the plurality of browsers transmitting the requests to the web application respectively, so that irrevocable actions can be executed conveniently without needing to reset the dataset of the web application; a response from the web application is distributed to each of the browsers, so that the same contents can be rendered on different browsers simultaneously, which facilitates comparison and analysis.

The present invention can be realized by hardware, software, or a combination thereof. The present invention can be implemented in a single computer system in a centralized manner or in a distributed manner in which different components are distributed in several inter-connected computer systems. Any computer system or other devices suitable for executing the method described herein are suitable. A typical combination of hardware and software can be a general-purpose computer system with a computer program, which, when being loaded and executed, controls the computer system to execute the method of the present invention and constitutes the apparatus of the present invention.

The present invention can also be embodied in a computer program product, which includes all the features that enable the realization of the methods described herein, and when being loaded into a computer system, can execute the method.

Although the present invention has been illustrated and described with reference to the preferred embodiments, those skilled in the art should appreciate that various changes both in form and details can be made thereto without departing from the spirit and scope of the present invention.

What is claimed is:

1. A data processing system comprising a data processor and a memory for cross-browser testing of a web application, comprising:

a first broker residing among a plurality of browsers on the data processing system for receiving information of a user action from a browser operated by a user among the plurality of browsers and for transmitting the information of the user action to other browsers so that the other browsers can execute the user action; and a second broker residing between the plurality of browsers and a web application for receiving at least one web request generated by executing the user action from the plurality of browsers and for determining whether the at least one web request can be merged, so as to determine whether the plurality of browsers are compatible with the web application.

2. The data processing system of claim 1, wherein if the second broker determines that the at least one web request is able to be merged, a merged request is generated and transmitted to the web application, wherein the second broker is further operable for receiving a response to the merged request from the web application and forwarding the response to each of the plurality of browsers so that the each of the plurality of browsers renders the response.

3. The data processing system of claim 1 further comprising a plug-in residing at the browser operated by the user for capturing the user action and transmitting the user action to the first broker.

4. The data processing system of claim 1 further comprising a plug-in residing at each of the other browsers for receiving the user action from the first broker and executing the user action at the each of the other browsers.

5. The data processing system of claim 1, wherein the second broker is set as a proxy of each of the plurality of browsers by using the proxy mechanism in the browser, so that the browser transmits a generated web request to the second broker.

6. The data processing system of claim 1, wherein if the second broker determines it is unable to merge the at least one web request, the second broker determines that the plurality of browsers are not compatible with the web application, and reports an incompatibility.

7. The data processing system of claim 1, wherein the second broker is further operable for determining it is unable to merge the at least one web request in at least one of the following conditions:

a first line of the at least one web request is not exactly the same;

headers of the at least one web request, a selected subset including Content-Type and Cookie are not the same; and data of the at least one web request is not exactly the same.

8. The data processing system of claim 1 further comprising a global logger for recording at least one of the following information:

the at least one web request from the plurality of browsers;

a merged request or merge error generated by the at least one web request;

a response from the web application;

a DOM structure or rendering error generated by rendering the response by each of the plurality of browsers; and a screenshot generated by rendering the response by the each of the plurality of browsers.

9. The data processing system of claim 8 further comprising a verification analyzer for analyzing information recorded by the global logger so as to determine the compatibility of the plurality of browsers, and obtain testing results of testing the web application by using the plurality of browsers.

10. A computer program product including a computer readable recordable medium having program code stored thereon, wherein the program code is operable for performing the steps of:

receiving, by a first broker residing among a plurality of browsers, information of a user action from a browser operated by a user among the plurality of browsers, and transmitting the information of the user action to other browsers so that the other browsers can execute the user action; and receiving, by a second broker residing between the plurality of browsers and a web application, at least one web request generated by executing the user action from the plurality of browsers and determining whether the at least one web request can be merged, so as to determine whether the plurality of browsers are compatible with the web application.

* * * * *